United States Patent
Tobagi et al.

Patent Number: 5,276,681
Date of Patent: Jan. 4, 1994

[54] PROCESS FOR FAIR AND PRIORITIZED ACCESS TO LIMITED OUTPUT BUFFERS IN A MULTI-PORT SWITCH

[75] Inventors: Fouad A. Tobagi, Los Altos; Joseph M. Gang, Jr., Saratoga; Allen B. Goodrich, Mountain View, all of Calif.

[73] Assignee: Starlight Networks, Mountain View, Calif.

[21] Appl. No.: 903,855

[22] Filed: Jun. 25, 1992

[51] Int. Cl.$^5$ ............ H04J 3/26; H04L 12/28
[52] U.S. Cl. ................ 370/85.4; 370/85.6; 370/85.15; 370/94.1
[58] Field of Search ............ 370/85.1, 85.4, 85.5, 370/85.6, 85.15, 60, 60.1, 94.1, 94.2, 94.3; 340/825.05, 825.5, 825.51, 825.07, 825.52

[56] References Cited

U.S. PATENT DOCUMENTS

| | | | |
|---|---|---|---|
| 4,849,968 | 7/1989 | Turner | 370/94.1 |
| 4,953,157 | 8/1990 | Franklin et al. | 370/85.6 |
| 4,993,025 | 2/1991 | Vesel et al. | 370/85.4 |
| 5,165,019 | 11/1992 | Sweazey | 395/200 |
| 5,165,024 | 11/1992 | Sweazey | 395/325 |

Primary Examiner—Douglas W. Olms
Assistant Examiner—H. Kizou
Attorney, Agent, or Firm—Meltzer Lippe Goldstein Wolf Schlissel & Sazer

[57] ABSTRACT

A process for fairly allocating resources in a multiport packet switch is disclosed. Each port is connected to a station and comprises a transmit FIFO buffer and a receive FIFO buffer. The ports are connected by a broadcast transmission medium. A transmit buffer of a specific port gains access to the transmission medium when the port possesses a token which is passed from port to port in a round-robin fashion. When a port recognizes that a transmitted packet is addressed to it, the port uses a local processor to determine whether or not to accept the packet. The determination is based on (1) information in the packet header, e.g., priority and address of the transmitting port, (2) the status of the receive buffer (full or not), and (3) other locally recorded information regarding past history of the acceptance or rejection of packets from particular ports and of particular priority classes needed to achieve fairness among packets of the same class and priority among different classes. If the receiving port makes a determination to reject a packet, the receiving port issues a busy signal which is transmitted over the broadcast medium. When the transmitting port receives the busy signal, it aborts transmission of the packet and releases the token. If the receiving port decides to accept the packet, the packet is written into the receive buffer of the receiving port.

19 Claims, 3 Drawing Sheets

PROCESS FOR FAIR AND PRIORITIZED ACCESS TO LIMITED OUTPUT BUFFERS IN A MULTI-PORT SWITCH

FIELD OF THE INVENTION

The present invention relates to a process for enabling transmitted packets to obtain fair access to a receive buffer in each port of a multiport switch or multiport network. The process provides for fairness in a system where all of the packets are of the same priority class. In the case where the packets being transmitted belong to multiple priority classes, the inventive process provides prioritized access to the receive buffer at each port according to priority class and fairness within each class. The inventive process also accounts for broadcast and multicast packets. The inventive process is especially useful in networks which simultaneously handle video and non-video data.

BACKGROUND OF THE INVENTION

The demand for networked digital audiovisual systems is expected to grow over the next few years, as business, government and other institutions increasingly turn to digital networks to distribute audiovisual information for education, presentations and reference applications. These customers expect systems that will allow a number of people to be able to view audiovisual information from a server simultaneously, while fully retaining their other network functions. For example, in business computing, most of the major productivity software developers see networked video as an effective means of training and supporting users. Many of these developers have begun including VHS videotapes for training with their software. Now they want to take this a step further by linking the video directly to their software's on-line help resources. Centralizing that support in a video server reduces the cost for customers with many users and ensures that it is properly maintained by the responsible persons.

Networked video presentation systems in business can allow corporate resources, such as sales videos, employee information, and video-based training to be available immediately to all employees from their desks. Similarly, networked video documentation systems will allow institutions of all kinds to maintain multi-user audiovisual databases. The largest population of users of such systems are likely to be health care institutions which have extensive audiovisual records. In addition, such databases can be used for on-the-job reference such as revisiting a complex procedure on the manufacturing floor, or creating on-line archive of TV commercials for an advertising agency.

Audiovisual communication including video conferencing, video mail, collaborative work, is yet another fast growing business application which requires the support of networked video over local area networks.

The characteristics of video traffic differ substantially from those of traditional data traffic to the point that local area networks designed primarily to support data applications are not appropriate to effectively support video services. With data applications, the data rate associated with a traffic source is highly variable; i.e., it exhibits a high peak to average ratio. Accordingly, the design of local area networks aimed at supporting data applications has been based on the principle of bandwidth sharing and statistical time multiplexing. In contrast, the data rate associated with the transmission of a video stream is relatively constant; the precise value depends on the particular encoding scheme used and the images quality desired, but it tends to be much higher than the average rate associate with a data traffic source. In particular, CCITT recommendation H.261 specifies video coding and decoding methods for audio-visual services at the rates of $p \times 64$ Kbits/s, where p is in the range 1 to 30; the MPEG standard specifies a coded representation that can be used for compressing video sequences to bit rates around 1.5 Mbits/s; Intel's DVI video streams have a data rate of 1.2 Mbits/s; the successor to MPEG, known as MPEGII, is being developed to provide a wider range of functionality and image quality than its predecessor at rates in the range of 4 to 8 Mbits/s.

Two important observations can be made. The first is that the volume of bits corresponding to a video segment of useful duration is large. A ten minute DVI video segment corresponds to 90 Mbytes. Ten hours correspond to over 5 Gbytes. Thus video servers for use in systems where shared video information is to be stored must be of relatively high capacity.

The second observation is that the transmission of a video signal of a certain data rate over a local area network requires the provision of a channel of the same data rate on a continuous basis so as to achieve timely delivery of the data. To support the transmission of multiple independent such video signals in a local area environment would require a network which can guarantee the bandwidth required for each video signal, and which has an aggregate bandwidth exceeding that required for the maximum configuration expected.

For a small number of users, simple and inexpensive solutions, such as Ethernet and token ring, may be adequate. For example, 5 DVI channels have an aggregate bandwidth of 6 Mb/s, well within the range of both Ethernet and the token ring network. But as the number of users increases, the required aggregate bandwidth of the network exceeds that of a single Ethernet or ring network, and other solutions are needed. One solution may be found in FDDI. This solution requires that each client be equipped with an FDDI interface card, which is substantially more expensive than the Ethernet card, while the client needs only a fraction of its capabilities. As simple and inexpensive interface cards at the client (e.g., Ethernet cards), are quite attractive and fairly widespread, it is desirable to look for a solution that could integrate such interfaces while meeting the bandwidth requirements for the maximum configuration. A possible solution is to use several Ethernet segments or ring networks, each supporting a small number of clients, and interconnect these segments via bridges. Each segment would then have to carry the traffic corresponding to the clients connected to it. The problem with this approach is that managing and controlling the video streams over an internet involving bridges and gateways proves to be quite complex. If a video server which handles all video streams is present, it requires a high bandwidth connection to the internet, and thus may have to be connected to all segments. A more attractive and flexible approach is the use of a star configuration with a switching hub in the center which guarantees a clear Ethernet channel or clear ring channel to each client over a dedicated twisted pair. In this configuration, the control of video streams and data traffic and the effect of one on another can be accomplished effectively in the hub. The server is also naturally connected to the hub via a link of sufficiently high data rate to support all video streams. The link may consist of multiple parallel Ethernet connections, or may be a joint-to-point FDDI link.

Figure 1:
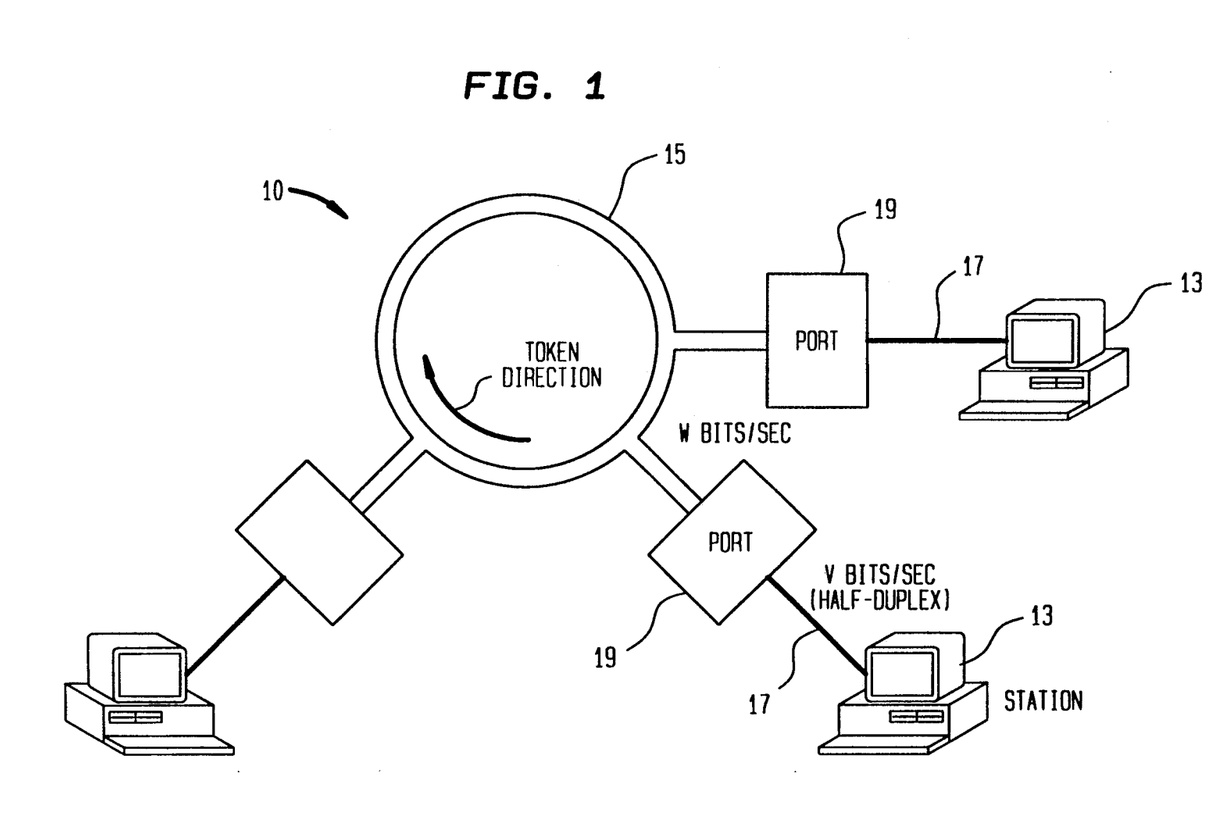
FIG. 1 schematically illustrates a system comprising a plurality of stations interconnected by a shared medium/broadcast type switch.
Figure 2:
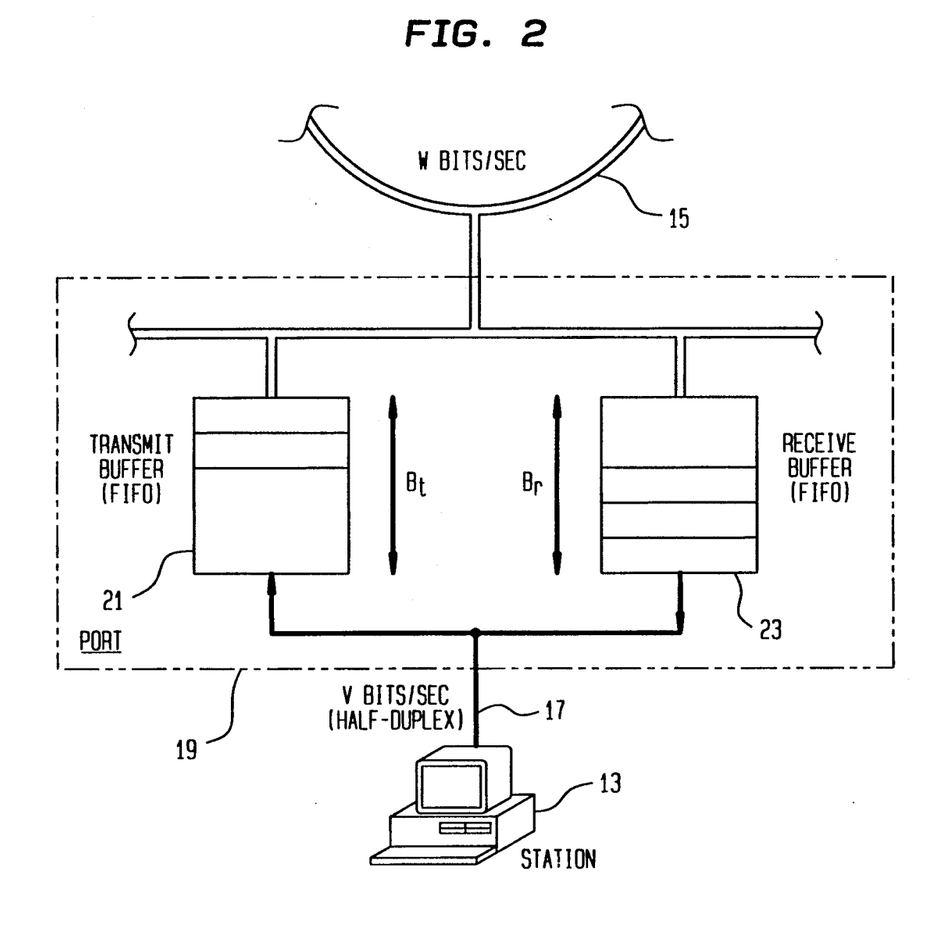
FIG. 2 schematically illustrates a port used to connect each station to the shared medium/broadcast type switch.

FIG. 1 schematically illustrates a system 10 comprising a plurality of stations 13 which communicate via a shared broadcast-type transmission medium 15 having a total bandwidth of W bits/s. Each station 13 is connected to the network 15 by means of a half-duplex link 17 of rate V bits/s and a port 19. As shown in FIG. 2, each port 19 comprises a transmit FIFO buffer 21 and a receive FIFO buffer 23, of capacity Bt and Br bits, respectively. In some cases, there may be more than one receive buffer at a port.

The transfer of data between a particular pair of stations 13 takes place in the form of packets of variable size, the maximum of which is denoted by $P_{max}$, and follows three steps: the packet is first transmitted by the sending station to its port, and is queued in the transmit buffer at that port; when it reaches the head of the queue, it is transmitted over the transmission medium 15 to the port to which the receiving station is connected, and is stored in its receive buffer; finally it is transmitted from the latter to the receiving station.

There are two types of shared resources in the system 1 of FIG. 1: one is the transmission medium 15 which all ports share to transmit packets; the other is the (finite) receive buffers at the ports for which incoming packets from various ports contend. Mechanisms are required to allocate these resources to requesters in an efficient and fair manner.

In the system 10 of FIG. 1, access to the transmission medium 15 is controlled by a token-passing round-robin mechanism. Such an access mechanism is simple to implement, and provides an efficient and fair allocation of the medium's bandwidth among transmitting stations at all times.

When, in the system 10 of FIG. 1, V is greater than or equal to W, and all stations 13 give priority to packet receptions over packet transmissions, then the receive buffers 23 are never full, and the transmission medium 15 is the only shared resource in the system. In this case, the token-passing mechanism is all that is needed. In most cases, however, V is smaller than W. As a result, depending on the traffic pattern among stations, it is likely at times for the particular receive buffer 23 at a particular port 19 to become full, and for packets being transmitted on the medium 15 and addressed to that particular port to be rejected. As the particular receive buffer (which gets emptied at the rate of V bits/s) becomes capable of accepting packets addressed to it, the question arises as to which sending port should be given the right to access the buffer. If the access right were given to the first sending port with a packet destined to that particular receive buffer which happens to capture the token, (i.e., if one were to allow the token passing mechanism to regulate access to receive buffers), then a certain degree of unfairness may result, in that it would be possible for some sending ports to monopolize the use of such receive buffers, while other sending ports are blocked repeatedly. Thus, an additional mechanism needs to be introduced to guarantee fair access to the receive buffers. It is an object of the present invention to provide a process for achieving fair access to such receive buffers.

Certain applications require that packets be prioritized, and that a certain degree of preference be given to higher priority packets when present. For example, as indicated above, in a network which handles video and non-video data, it is often necessary to give video information priority over non-video information in order to maintain the quality of real time video transmissions. Consider that there are K priority levels (0 representing the highest level, and K-1 the lowest), and that a single priority value is assigned to each packet. It is a further object of the invention to provide access to the receive buffers according to a process which gives higher priority packets preferential access to receive buffers when congestion occurs.

Clearly, should congestion at a receive buffer occur and persist over time, giving absolute priority access to higher priority packets could cause a lower priority packet waiting at the head of the queue at some port to be blocked repeatedly for a long time. This situation is undesirable, especially since there may be packets waiting behind the blocked one, possibly of higher priority and/or destined to other (possibly uncongested) ports which are also blocked (an effect referred to as head-of-the-line (HOL) blocking). It is a further object of the process of the present invention to provide a solution to the head-of-the-line blocking problem, while guaranteeing fairness within each priority class.

SUMMARY OF THE INVENTION

In accordance with the present invention, when a port recognizes that a currently arriving packet is addressed to it, the port uses a local processor to determine whether to accept or reject the packet. The determination is based on (1) information in the packet header (e.g., priority and address of the transmitting port);

(2) the status of the receive buffer (full or not); and (3) other locally recorded information regarding past history of acceptance or rejection of packets from particular transmitting ports and of particular priority classes needed to achieve fairness among packets of the same class and priority between different classes.

If the determination is to accept the packet, the packet is written into the receive buffer of the port. If the determination is to reject the packet, then the port issues a busy signal. When the transmitting port detects the busy signal, it aborts its transmission, maintains the packet at the head of its transmit buffer and releases the token. Otherwise, the token is released after transmission is complete. To overcome the head-of-the-line blocking problem, whenever a packet of a certain priority gets blocked, a limit is placed on the number of higher priority packets that may be accepted by the desired receiving port prior to accepting the blocked packet. This emulates a non-uniform asynchronous time division scheme.

The inventive process also accounts for broadcast and multicast packets by assigning to these packets the highest and next highest priority classes, respectively. In addition, when broadcast or multicast packets are present, capacity is reserved for them at the receive buffers. These two steps mitigate congestion which can arise when a broadcast or multicast packet is blocked from being accepted at one of the plurality of ports to which it is destined.

It is a significant advantage of the present invention that the accept/reject decision for currently arriving packets is made locally at each port. There is no global control mechanism which controls access to the receive buffers at individual ports. The locally executed packet accept/reject algorithms of the present invention utilize only information contained in the headers of currently arriving packets, locally recorded information about the status of the receive buffer and previously accepted and rejected packets, the FIFO nature of the transmit and receive buffers at each port, and the nature of the token passing mechanism for providing access to the shared transmission medium.

DETAILED DESCRIPTION OF THE INVENTION

A. Port Architecture

Figure 3:
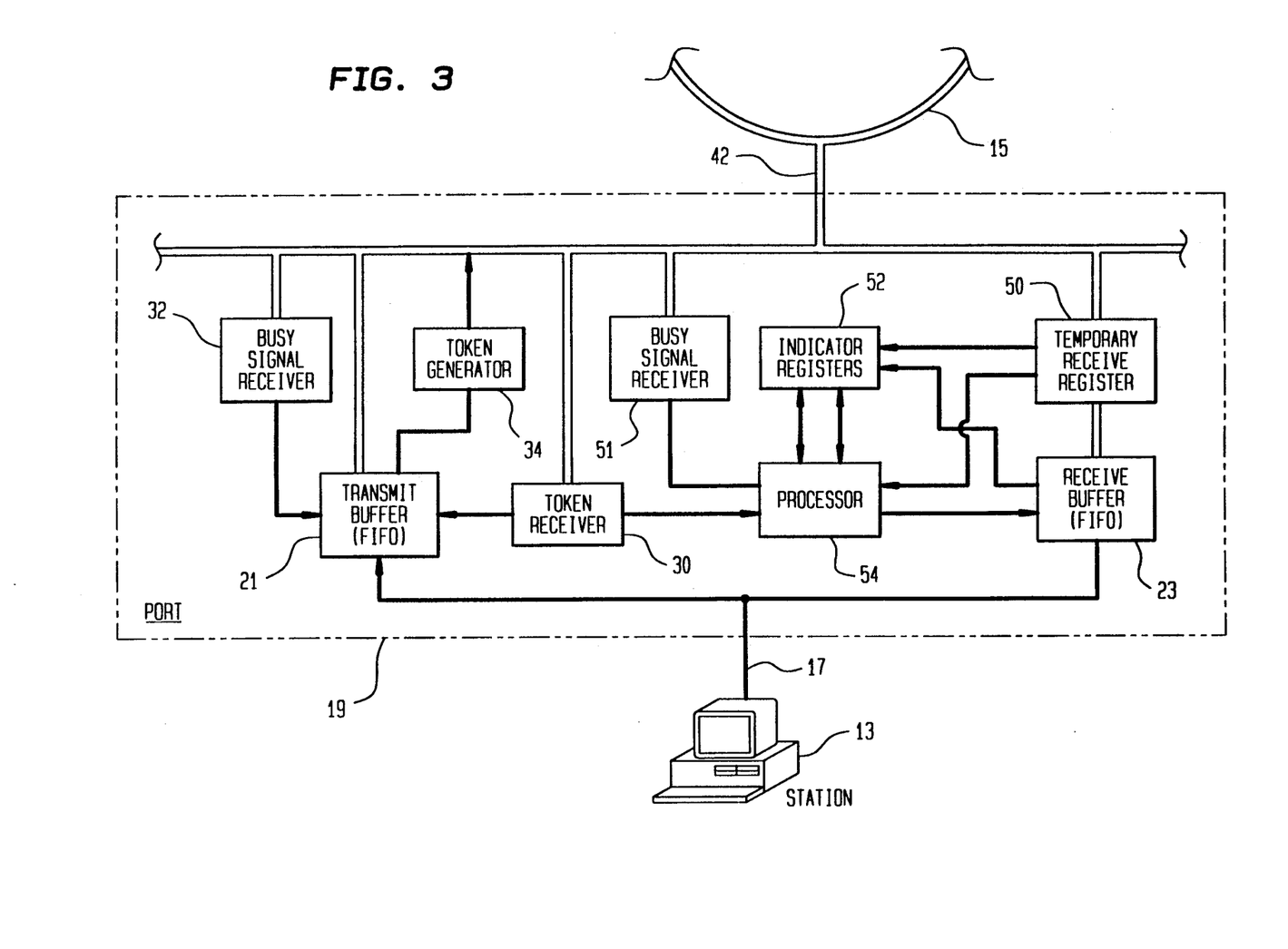
FIG. 3 illustrates the port of FIG. 2 in greater detail.

A port 19 (see FIG. 1 and FIG. 2) which carries out the process of the present invention is illustrated in greater detail in FIG. 3. A half-duplex bidirectional link 17 connects the station 13 to the port 19. The port 19 interfaces the station 13 to the shared medium/broadcast type switch 15 through use of the local bus 42.

As indicated above, the port 19 comprises a transmit buffer 21 of capacity Bt and a receive buffer 23 of capacity Br. The transmit buffer 21 sends packets from the station 13 out onto the shared transmission medium 15. The receive buffer 23 receives packets from the shared transmission medium 15.

As also indicated above, access of the transmit buffer 21 to the shared transmission medium 15 is controlled by a token passing scheme. In this scheme, a token is passed from port to port in a round robin fashion using a special channel of the shared transmission medium.

Thus, the port 19 of FIG. 3 includes a token receiver which receives the token from the shared medium 15. When the port 19 of FIG. 3 receives the token at the token receiver 30, the transmit FIFO buffer gains access to the shared medium 15.

When the transmit FIFO buffer 21 completes transmission of a packet via the shared transmission medium, or else receives at a busy signal receiver 32 a busy signal indicating that transmission of a packet should be aborted because the receiving port cannot accept the packet, the token is released. In this case, the token generator 34 regenerates the token for transmission via a special channel in the shared transmission medium to the next port. The busy signal is also transmitted via a special channel in the transmission system 15.

The port 19 also includes circuit elements which enable the port to determine whether or not to accept into the receive buffer 23 a packet transmitted via the shared medium 15 and local bus 42 from another port. The circuit elements for making this accept/reject determination include the temporary receive register 50, the indicator registers 52, and the processor 54.

The temporary receive register 50 stores at least a header which indicates priority class, transmitting port address and destination address of a packet broadcast via the shared transmission medium 15 and local bus 42. The indicator registers store the status of the receiver buffer (full or not) and other information concerning the past history of the acceptance or rejection of packets from particular transmitting ports and belonging to particular priority classes. The processor 54 uses the information in the temporary receive buffer 50 and indicator registers 52 to decide whether or not to accept a currently arriving packet. If the currently arriving packet is accepted, control signals are sent from the processor 54 to the temporary receive buffer 50 and receive FIFO buffer 23 which enable the currently arriving packet to be written into the receive FIFO buffer 23. If the determination is to reject the packet, a busy signal is generated by the busy signal generator 56. The busy signal is transmitted via the local bus 42 and shared transmission medium 15 to the transmitting port. The busy signal is received in the busy signal receiver of the transmitting port and causes the transmission of the rejected packet to be aborted.

The algorithms utilized in the port 19 of FIG. 3 to determine whether to accept or reject an arriving packet are considered in detail below.

In considering the accept/reject algorithms, it is assumed that the shared medium 15 has a bandwidth which is not a limited resource, (e.g., $W = N \times V$,) and thus a common non-prioritized round robin token passing scheme is adequate for the sharing of that resource. The issue at hand is to manage access to the receive buffers.

The ports 19 are addressed sequentially $0, 1, 2 \ldots, N-1$ starting at some arbitrary port, according to either their physical location on the network, or some predetermined logical order. A single token exists in the network at all times, which is transmitted from port to port in a round robin fashion in the manner indicated above. When a port receives the token, if its transmit buffer is empty, it releases the token; otherwise, it holds the token and begins transmitting the packet at the head of the queue in its transmit buffer.

The packet header contains three fields of interest:
p: the priority of the packet;
tp: the number (i.e., address) of the transmitting port;
da: the number (i.e., address) of the desired destination port.

Due to the broadcast nature of the transmission medium 15, all ports are capable of seeing each transmitted packet. As indicated above, when a port recognizes that a packet is addressed to it, the port determines whether to accept the packet or not based on the information in the packet header (p, tp, da), the status of the receive buffer (full or not), and other locally recorded information regarding past history (needed to achieve priority access and fairness). If the port can accept the packet, then the packet is written into the receive buffer; otherwise, the port rejects the packet and issues a busy signal. When the transmitting port detects the busy signal, the transmitting port aborts transmission of the packet and releases the token.

The receive buffer at a port is said to be full if the content of the buffer (denoted by C) is greater than the buffer size (B) minus the maximum packet size in the system ($P_{max}$). Otherwise the receive buffer is said to be not full. A boolean variable BF is introduced and stored in the indicator register 52 at each port to indicate the status of the receive buffer. This indicator is used as follows:

---

BF (Buffer Full indicator):
$BF = 0$ (buffer not full) if $C <= B - Pmax$,
$BF = 1$ (buffer full) if $C > B - Pmax$.

All algorithms described below pertain to a given port and its receive buffer. Without loss of generality, we consider the port address or number under consideration to be 0. In case the port address number is different from 0, (say i), then the following transformation is performed on all port numbers handled by the algorithms:

Port Number Mapping: Port number j is replaced by j−i mod(N); i.e., j is replaced by j−i for j=i, i+1, . . . , N−1, and by j−i+N for j=0,1, . . . , i−1.

B. Algorithm With Fairness

To illustrate the problem of unfairness, consider two ports, namely i and j, i<j, with packets destined to port O. Assume that when port i receives the token, the receive buffer at port O is full, and thus the packet transmission is aborted. Assume also that when port j receives the token, the buffer at port O becomes not full, and thus the packet is received. It is quite possible that the reception of port j's packet fills the buffer up again, and that this condition remains in effect when the token reaches port i the second time around. It is also quite possible that the buffer becomes not full by the time the token reaches j the second time around, and thus for j to have access again before port i had the chance to get its packet in. This situation may have a very high likelihood of occurrence if port O is a server to which packets from many different ports are addressed.

Fairness can be achieved by using the indicator registers 52 (see FIG. 3) in which port O records the number of the first transmitting port to be blocked. Once a port number is thus recorded, then port O denies access to its buffer to all but the port recorded. That is, when the buffer becomes not full, then the first packet to be accepted is that transmitted by the recorded port. Following that point in time, if the buffer remains not full, then packets are accepted from subsequent ports in the order in which the token reaches them. Whenever the buffer becomes full, (which could have well been the case immediately following the reception of the packet from the previously recorded port), then the first port to be blocked is recorded. And so on, so forth.

Thus fairness is achieved with the addition of two elements:

RTP (Recorded Transmit Port): a register (maintained in the indicator registers 52) in which the number of the first transmitting port to be blocked following the freeing of the receive buffer is stored.

RF (Register Full Indicator): a flag (also maintained in the indicator registers 52) used to indicate whether RTP is used (RF=1) or not (RF=0)

The processor 54 of port O executes the following packet accept/reject determination algorithm to achieve fairness for a system with a single priority class of packets when a packet arrives at the port O:

---

If RF=0, then
    if BF=0, accept packet;
    else,
        reject the packet;
        record the packet (RF=1, RTP=tp).
If RF=1, then
    if BF=0 and tp=RTP, then
        accept the packet;
        clear entry (set RF=0);
    else, reject the packet.

---

C. Robustness

Although the algorithm set forth above is fair, a problem with this algorithm is that it is not robust. Indeed, it is possible for the port which has been previously recorded in RTP to discard the packet destined to 0, and for subsequent packets to be destined to ports other than 0. In such a situation, the entry in RTP remains valid and blocks all other ports with packets destined to port O until the port recorded in RTP gets again a packet destined to port O (which may very well be a long time). To overcome this problem, a flag V is maintained in the indicator registers 52 and used to validate an entry in RTP in each round.

V (Valid RTP indicator): a bit maintained in the indicator registers 52 used to validate an entry in RTP. When port O receives the token in the token receiver 30 (see FIG. 3), the processor 54 sets V to 0. It sets V to 1 whenever a new RTP entry is recorded, and whenever the port recorded in RTP is rejected. Upon receiving the token back, RF=V=1 indicates that the RTP entry is valid and should be retained, while RF=1 and V=0 indicates that the RTP entry has not been validated and may be erased. The combination RF=0 and V=1 is not valid.

The definition and use of V rests on the fact that transmit buffers are FIFO queues, and the fact that a port with a nonempty transmit buffer always attempts to transmit the packet at the head of the queue upon receiving the token.

To explain the use of V, consider first the case in which RF=1. At the beginning of the round (which is when port O receives the token), V is set to 0 indicating that the entry in RTP has not yet been validated. Every time a packet is received, tp is compared to RTP; if tp<RTP (i.e., the token is still upstream of RTP), V is maintained at 0 and the packet is rejected. If tp=RTP, then V is updated as follows:

if the packet is accepted (due to buffer not full), the RTP entry is erased (RF is set to 0), and V is maintained at 0; if, however, the packet could not be received (BF=1), then V is set to 1, validating the entry. Consider now the case RF=1 and tp>RTP; the action depends on V as follows: if V=1 (meaning that the entry in RTP has already been validated), the packet is rejected, and V is maintained at 1; if, however, V=0 (implying that the transmitting port corresponding to the entry in RTP has not responded when the token visited it), then the RTP entry is erased (setting RF=0), and the decision to receive or reject the packet is made according to whether BF=0 or 1, respectively; in case the packet is rejected, tp is recorded in RTP and V is set to 1. The case in which RF=0 is also clear noting that V is set to 1 whenever a new entry is made.

Upon receiving the token back at the end of the round, port examines V. The combination RF=1 and V=1 indicates that the entry has been validated. The combination RF=1 and V=0 indicates that the entry in RTP has not been validated and thus must be erased.

When a packet destined to port O is received, the processor at port O executes the following algorithm:

---

If RF=0 [only V=0 is possible], then
    if BF=0, accept the packet;
    else,
        reject the packet;
        record the packet (RF=1, RTP=tp);

-continued

```
        set V=1.
If RF=1, then
    if tp<RTP [only V=0 is possible], then reject the packet;
    if tp=RTP [only V=0 is possible], then
        if BF=0, then
            accept the packet;
            erase the entry (RF=0);
        else,
            reject the packet;
            set V=1;
    if tp>RTP, then
        if BF=0 and V=0 then
            accept the packet;
            erase the entry (RF=0);
        else,
            reject the packet;
            if V=0, then
                record the packet (RF=1, RTP=tp);
                set V=1.
When the token is received, then
If RF=0 and V=0, then nothing;
If RF=1 and V=0, then erase the entry (RF=0);
If Rf=1 and V=1, then reset V=0;
if RF=0 and V=1 (illegal state) then set V=0.
```

D. Priority Access

To achieve priority access, knowledge of the highest priority level of all packets waiting and destined to port O is ideally obtained at all times. Because in the distributed environment under consideration, global knowledge of all such packets cannot be easily obtained, an assessment of the highest priority class with a packet waiting for transmission to port O is made based on information about each port which is collected at the time the token visits that port. Clearly, such an assessment is limited by the fact that it does not reflect the changes which could take place at a port between the time the token visits that port and the time the information is used. For example, a port may have had no packet waiting when it was last visited by the token, and later receive a packet, possibly of higher priority level than the currently assessed value. Similarly, if the head of the queue at some port is successfully received by port O and is thus removed, no knowledge is available about the next packet in line. Nevertheless, such an assessment is the best that can be made, and is used in the algorithms presented below. Let h denote the highest priority level with a packet known to be waiting for transmission and acceptance by port O. (It should be noted that a value h is maintained in the indicator registers 52 of each port and denotes the highest priority level of a packet waiting for acceptance by that port). A description of how to best assess h is given below.

Given h, by priority access, the following is meant: (i) a packet of priority lower than h is rejected; (ii) a packet of priority equal to h may be received, subject to both BF=0 and fairness within that class, and (iii) a packet of priority higher than h may be received, subject only to BF=0.

To achieve fairness within a given priority level k, k=0,1, ..., k−1 (where smaller k indicates higher priority), the indicator registers 52 (see FIG. 3) maintain a set of three elements RTP(k), RF(k), and V(k) for each priority class k. In other words, the elements RTP, RF and V, as defined and used above, are maintained separately at each port for each class, independently of all other classes. The only modification to be made here is to prevent packet acceptance from taking place should a packet have a priority p such that p>h, where p>h indicates a lower priority class than h.

The issue of how to assess h is now considered. The simplest approach is to consider that h=m at all times, where m equals the smallest value of k such that RF(k)=1; if RF(k)=0 for all k, then m=K−1.

This means that whenever a packet of priority p<h is rejected, then h is set to p; whenever the packet recorded in RTP(h) is accepted and its entry removed, then h is set to the updated value of m. This leads to the following algorithm:

When a packet destined to port O is received, the processor 54 at port O executes the following algorithm:

```
If RF(p)=0 [only V(p)= is possible], then
    if BF=0 and ph<h, then
        accept the packet;
    else,
        reject the packet;
        record the packet (RF(p)=1, RTP(p)=tp);
        set V(p)=1;
        if p<h, set h=m=p.
If RF(p)=1 [p>=h], then
    if tp<RTP(p) [only V(p)=0 is possible], then reject the packet;
    if tp=RTP(p) [only V(p)=0 is possible], then
        if BF=0 and p=h, then
            accept the packet;
            erase the entry (RF(p)=0);
            update m;
            set h=m;
        else,
            reject the packet;
            set V(p)=1;
    if tp>RTP(p), then
        if BF=0, V(p)=0 and p=h, then
            accpt the packet;
            erase the entry (RF(p)=0);
            update m:
            set h=m;
        else,
            reject the packet;
            If V(p)=0, then
                record the packet (RF(p)=1, RTP(p)=tp);
                set V(p)=1;
When the token is received, then
For k=0, 1, ..., K−1, do:
    If RF(k)=0 and V(k)=0, then nothing;
    If RF(K)=1 and V(k)=0, then
            erase the entry (RF(k)=0);
            if k=m, update m and set h=m:
    If RF(K)=1 and V(k)=1, then reset V(k)=0;
    If RF(k)=0 and V(k)=1 (illegal state) then set V(k)=0.
```

While the above algorithm is quite legitimate, updating h to the new value of m following the removal of an entry ignores the fact that other packets of priority level h may have been present but could not be recorded, and as a result would be preempted by lower levels. To prevent this from occurring, an indicator W(h) is maintained in the indicator register 52 which is used to indicate, at the time the packet recorded in RTP(h) is accepted and its entry removed, whether or not there are other packets of priority h present waiting; if there is no such packet, then h is updated to m, otherwise, h remains the same. For this mechanism to work properly, an indicator W(k) must be introduced for each priority level k, k=0, 1, ..., K−1, so that when h is updated to m following the removal of an entry, the indicator W(h) is guaranteed to have been properly maintained. W(k) (level k packets waiting indicator): It is initialized to 0 whenever a new entry is made in RTP(k). It is also reset to 0 whenever RTP(k) is visited by the token, and RTP(k) attempts to transmit a packet of priority k. It is set to 1 whenever a port other than RTP(k) attempts to transmit a packet of priority k. When the packet recorded in RTP(h) is accepted and the entry removed, then h is set to the updated value of m if W(h)=0, and left unchanged otherwise. The packet's waiting indicators W(k) are stored in the indicator registers 52 of port O and all other ports.

The resulting algorithm is given below.

When a packet destined to port O is received, the processor 54 at port O executes the following algorithm:

```
If RF(p)=0 [only V(p)=0 is possible], then
    if BF=0 and p<=h, then
        accept the packet;
    else,
        reject the packet;
        record the packet (RF(p)=1, RTP(p)=tp);
        set V(p)=1;
        set W(p)=0
        if p<h, set h=m=p;
If RF(p)=1 [p<h is not possible], then
    if tp<RTP(p) [only V(p)=0 is possible, then
        reject the packet;
        set W(p)=1;
    if tp=RTP(p) [only V(P)=0 is possible], then
        if BF=0 and p=h, then
            accept the packet;
            erase the entry (RF(p)=0);
            update m;
            if W(h)=0, set h=m;
        else,
            reject the packet;
            set V(p)=1;
            set W(p)=0;
    if tp>RTP(p), then
        if BF=0, V(P)=0 and p=h, then
            accept the packet;
            erase the entry (RF(p)=0);
            update m;
            if W(h)=0, then set h=m;
        else,
            reject the packet;
            If V(p)=0, then
                record the packet (RF(p)=1, RTP(p)=tp);
                set V(p)=1;
                set W(p)=0;
            else, set W(p)=1
```

When the token is received, then

```
For k=0, 1, ..., K-1, do:
    If RF(k)=0 and V(k)=0, then nothing;
    If RF(k)=1 and V(k)=0, then
                    erase the entry (RF(k)=0);
                    if k=m, then
                        update m;
                        if W(h)=0, set h=m;
    If RF(k)=1 and V(k)=1, then reset V(k)=0;
    If RF(k)=0 and V(k)=1 (illegal state) then set V(k)=0.
```

The problem with the above algorithm is that it is vulnerable to packets getting discarded. Indeed, if the packet(s) that have caused W(h) to be set to 1 have been discarded, then W(h) will remain set to 1 until a packet of priority h reappears. Such a problem may be fixed by having W(h) validated in each round, making use of the visit of the token to port O in the process, an event guaranteed to take place once per round. This can easily be accomplished with the introduction of an indicator Wt used at the time the token visits port O, in case RF(h)=0, to indicate whether or not packets of priority h are present waiting.

Wt (packets waiting indicator): It is initialized to 0 by port O at the beginning of the round. It is set to 1 whenever RF(h)=1 and a packet with priority level h and tp<RTP(h) is rejected. At the end of the round, after all entries have been refreshed, if RF(h)=0, the priority level h is maintained if Wt=1, and set to m if Wt=0. Wt is maintained in the indicator registers 52 (see FIG. 3).

Before making use of Wt in the previous algorithm to achieve robustness, it should be noted that one could avoid the robustness problem altogether if one were to update h only when the token visits port O using Wt. The algorithm which updates h when the token visits port O is given below.

When a packet destined to port O is received, the processor at port O operates as follows:

```
If RF(p)=0 [only V(p)=0 is possible], then
    if BF=0 and p<=h, then
        accept the packet;
    else,
        reject the packet;
        record the packet (RF(p)=1, RTP(p)=tp);
        set V(p)=1;
        if p<h, then set h=m=p.
If RF(p)=1 [p>=h], then
    if tp<RTP(p) [only V(p)=0 is possible], then
        reject the packet;
        if p=h, then set Wt=1;
    if tp=RTP(p) [only V(p)=0 is possible], then
        if BF=0 and p=h, then
            accept the packet;
            erase the entry (RF(p)=0);
            update m;
        else,
            reject the packet;
            set V(p)=1;
    if tp>RTP(p), then
        if BF=0, V(p)=0 and p=h, then
            accept the packet;
            erase the entry (RF(p)=0);
            update m;
        else,
            reject the packet;
            If V(p)=0, then
                record the packet (RF(p)=1, RTP(p)=tp);
                set V(p)=1;
```

When the token is received, then

```
For k=0, 1, ..., K-1, do:
    If RF(k)=0 and V(k)=0, then nothing;
    If RF(k)=1 and V(k)=0, then
                    erase the entry (RF(k)=0);
                    if k=m, update m;
    If RF(k)=1 and V(k)=1, then reset V(k)=0;
    If RF(k)=0 and V(k)=1 (illegal states) then set V(k)=0.
    For k=h, if RF(h)=0 and Wt=0, then set h=m;
    Reset Wt=0.
```

The best results is obtained if the updating of h when RTP(h) is accepted, combined with the use of Wt for robustness purposes. The complete algorithm follows.

When a packet destined to port O is received, port O operates as follows:

```
If RF(p)=0 [only V(p)=0 is possible], then
    if BF=0 and p<=h, then
        accept the packet;
    else,
        reject the packet;
        record the packet (RF(p)=1, RTP(p)=tp);
        set V(p)=1;
        set W(p)=0.
        if p<h, set h=m=p;
If RF(p)=1 [p<h is not possible], then
```

```
-continued
    if tp<RTP(p) [only V(p)=0 is possible], then
        reject the packet;
        set W(p)=1;
        if p=h, then set Wt=1;
    if tp=RTP(p) [only V(p)=0 is possible], then
        if BF=0 and p=h, then
            accept the packet;
            erase the entry (RF(p)=0);
            update m;
            if W(h)=0, set h=m;
        else,
            reject the packet;
            set V(p)=1;
            set W(p)=0;
    if tp>RTP(p), then
        if BF=0, V(p)=0 and p=h, then
            accept the packet;
            erase the entry (RF(p)=0);
            update m;
            if W(h)=0, then set h=m;
        else,
            reject the packet;
            If V(p)=0, then
                record the packet (RF(p)=1, RTP(p)=tp);
                set V(p)=1;
                set W(p)=0;
            else, set W(p)=1.
```

When the token is received, then

```
For k=0, 1, ..., K-1, do:
    If RF(k)=0 and V(k)=0, then nothing;
    If RF(k)=1 and V(k)=0, then
                    erase the entry (RF(k)=0);
                    if k=m, update m;
    If RF(k)=1 and V(k)=1, then reset V(k)=0;
    If RF(k)=0 and V(k)=1 (illegal state) then set V(k)=0.
For k=h, if RF(h)=0 and Wt=0, then set h=m;
Reset Wt=0.
```

A more condensed version of the above algorithm follows:

When a packet destined to port O is received, the processor 54 at port O operates as follows:

```
If RF(p)=0 [only V(p)=0 is possible], then
    if BF=0 and p<=h, then
        accept the packet;
    else,
        reject the packet;
        record the packet (RF(p)=1, RTP(p)=tp);
        set V(p)=1;
        set W(p)=0.
        if p<h, set h=m=p;
If RF(p)=1 [p<h is not possible], then
    if tp<RTP(p) [only V(p)=0 is possible], then
        reject the packet;
        set W(p)=1;
        if p=h, then set Wt=1;
    if tp>=RTP(p) [if tp=RTP(p), then only V(p)=0 is
    possible], then
        if BF=0, V(p)=0 and p=h, then
            accept the packet;
            erase the entry (RF(p)=0);
            update m;
            if W(h)=0, then set h=m;
        else,
            reject the packet;
            if V(p)=0, then
                record the packet (RF(p)=1, RTP(p)=tp);
                set V(p)=1;
                set W(p)=0;
            else, set W(p)=1.
```

When the token is received, then

```
For k=0, 1, ..., K-1, do:
    If RF(k)=0 and V(k)=0, then nothing;
    IF RF(k)=1 and V(k)=0, then
                    erase the entry (RF(k)=0);
                    if k=m, update m;
    If RF(k)=1 and V(k)=1, then reset V(k)=0;
    If RF(k)=0 and V(k)=1 (illegal state) then set V(k)=0.
For k=h, if RF(h)=0 and Wt=0, then set h=m
Reset Wt=0.
```

E. Priority Access With Broadcast and Video Multicast Packets

A broadcast packet is one which is addressed to all ports; it must be accepted by all ports to be considered successful. A multicast packet is one which is addressed to a subset of ports; it must be accepted by all ports in the subset identified to be successful. In either case, if a port must reject the packet due to buffer full, that port sends a busy signal causing the transmitting port to abort the transmission of the packet. Due to the broadcast nature of the network, all interested ports can observe the busy signal on the network, and record the packet as described above. Such recording is used to guarantee fairness among outstanding broadcast and multicast packets.

Because broadcast and multicast packets require that all interested ports have their buffer not full to be accepted, it is appropriate to give such packets the highest priority. This will prevent rejection of such packets from occurring repeatedly due to different receiving buffers becoming full. Note however that, with this approach, the presence of a blocked broadcast or multicast packet due to some port's buffer being full prevents other ports with relatively empty receive buffers from accepting individually addressed packets. Therefore, congestion at a single port will have an effect on the throughput of the entire network if the blocked packet is of the broadcast type; if the blocked packet is of the multicast type, the same effect exists with respect to the throughput of all ports in the multicast group.

To overcome this undesirable effect, a good solution is to still assign the highest priority to broadcast and multicast packets, and to consider the rejection of individual packets to be based not directly on the presence of broadcast and multicast packets as would be the case in a pure priority access scheme, but rather on the buffer full condition using a new definition thereof which reserves buffer space for blocked broadcast and multicast packets. To keep the algorithm simple, the space reserved for a blocked broadcast packet or a blocked multicast packet is not made a function of how many such packets are known to be outstanding, but rather of the fact that there are some. It is preferable to assign broadcast and multicast packets two separate priority levels, with broadcast packets given the highest level (namely level 0), and multicast packets, the next highest (namely, level 1). Individually addressed packets are assigned levels, 2, 3, ..., K−1 as appropriate.

New definition for buffer full: Upon reception of a packet of a certain type, i.e., broadcast (priority level 0), multicast (priority level 1), and individually addressed (priority levels k>1)) the definition of buffer full is as follows:

Broadcast, BF(O)=1: The buffer is considered to be full if its content exceeds its size minus the maximum packet size. (Note that if the maximum size of a broadcast packet is known to be different from that of other types, e.g., smaller, then one could take that into consideration as well.)

Multicast, BF(1)=1: The buffer is considered to be full if its content exceeds its size minus once or twice the maximum packet size depending on whether there is 0 or more broadcast packets known to be outstanding, respectively.

Individually addressed BF(>1)=1: The buffer is considered to be full if its content exceeds its size minus: (i) the maximum packet size if neither a broadcast nor a multicast packet is known to be outstanding, (ii) twice the maximum packet size if either at least one broadcast or at least one multicast packet is known to be outstanding, but not both, and (iii) three times the maximum packet size if both at least one broadcast packet and at least one multicast packet are known to be outstanding.

Knowledge of whether there is an outstanding packet of a certain priority level k or not is based on RF(k) and W(k). Letting X(k) denote the OR of both RF(k) and W(k), we have BF(0)=1 if C>B−Pmax
BF(1)=1 if C>B−(1+X(0))Pmax
BF(>1)=1 if C>B−(1+X(0))Pmax
BF(k), k=0,1,>2 are assessed each time a new entry in RTP is made for a broadcast or a multicast packet and each time such a packet is accepted, as these are the times when X(0) and X(1) may change.

Note that, for robustness purposes, it is desirable to add two new indicators, Wt(0) and Wt(1), the definition and use of which are the same as for Wt previously introduced. (Note that in the present context, it would be appropriate to rename Wt by instead, for clarity and consistency in the presentation of the algorithm, there is introduced one such indicator for each priority level, namely Wt(k), k=0, 1, ..., K−1). The definition of m is as before, excluding the broadcast and multicast types; that is m is the smallest value k, 1<k<=K−1, such that if RF(k)=0 for k=2,3,..., K−1, then m=K−1.

The algorithm which accommodates broadcast and multicast traffic as described above follows (in its condensed version).

When a packet destined to port O is received, the processor 54 at port O executes the following algorithm:

```
If RF(p)=0 [only V(p)=0 is possible], then
    if BF(p)=0 and p<=h, then
        accept the packet;
    else,
        reject the packet;
        record the packet (RF(p)=1, RTP(p)=tp);
        set V(p)=1;
        set W(p)=0;
        if p=0 or p=1, then
            set X(p)=1;
            for k=p+1,..., K−1, update BF(k);
        if 1<p<h, then set h=m=p;
If RF(p)=1, then
    if tp<RTP(p) [only V(p)=0 is possible], then
        reject the packet;
        set W(p)=1;
        set Wt(p)=1;
    if tp>=RTP(p) [for tp=RTP(p), only V(p)=0 is possible],
    then
        if BF(p)=0, V(p)=0 and p<=h, then
            accept the packet;
            erase the entry (RF(p)=0);
```

-continued

```
            if ((p=0 or p=1) and W(p)=0), then
                set X(p)=0;
                for k=p+1,..., K−1, update BF(k);
            if p=h then
                update m;
                if W(h)=0, set h=m;
        else,
            reject the packet;
            If V(p)=0, then
                record the packet (RF(p)=1, RTP(p)=tp);
                set V(p)=1;
                set W(p)=0;
            else, set W(p)=1.
```

When the token is received, then

```
For k=0, 1, ..., K−1, do:
    If RF(k)=0 and V(k)=0, then nothing;
    If RF(k)=1 and V(k)=0, then
                        erase the entry (RF(k)=0);
                        if k=h, update m;
    if RF(k)=1 and V(k)=1, then reset V(k)=0;
    If RF(k)=0 and V(k)=1 (illegal state) then set V(k)=0.
For j=0, 1, if RF(j)=0 and Wt(j)=0, then
                set X(j)=W(j)=0;
                for k=j+1,..., K−1, update
                BF(k);
For k=h, if RF(h)=0 and Wt(h)=0, then set h=m;
Reset Wt(k)=0.
```

F. Priority Access With Broadcast and Multicast and Preemption

Should congestion at a receive buffer occur and persist over time, giving absolute priority access to higher priority packets could cause a lower priority packet waiting at the head of the queue at some port to be blocked repeatedly for a long time. This situation is undesirable, especially since there may be packets waiting behind the blocked one, possibly of higher priority and/or destined to other (possibly uncongested) ports which are also blocked (an effect referred to as head-of-the line (HOL) blocking). To overcome this problem, whenever a packet of a certain priority level gets blocked, a limit is placed on the number of packets of higher priority that may be admitted prior to admitting the blocked packet. For k=2, 3, ..., K−1, there are introduced the following new variables which are maintained in the indicator registers 52 (see FIG. 3):

M(k) is a fixed number which represents the maximum number of packets of priority higher than k which can be received prior to receiving the packet of priority k held in the transmit buffer of port RTP(k).

C(k) is a counter which is loaded with M(k) whenever a new entry is made into RTP(k). It is decremented by one each time a packet with priority higher than k is received. When the counter reaches 0, the packet identified by this entry in RTP(k) reaches super priority status; it must be received prior to receiving any non super priority packet (even of higher priority than k). If there are several values of k for which C(k)=0, the corresponding packets are received in order of their priorities.

SP(k) is a register which indicates whether the packet identified by RTP(k) has reached super priority status. When a new entry is made into RTP(k), SP(k) is set to 0. When C(k) reaches 0, then SP(k) is set to 1. When an entry is erased, SP(k) is reset to 0.

Let u denote the value of k such that <notRF(k), notSP(k),k> is smallest.

Noting that u can change upon accepting a packet, each time a packet is accepted, u is updated. Note that SP(u) may or may not be equal to 1. Whenever SP(u)=0, then u and h must be equal. However, when SP(u)=1, then u may or may not be equal to h; if u and h are different, then u must be larger than h. Whenever SP(u)=1, the packet identified in RTP(u) is to preempt all other packets, including broadcast and multicast; only after this particular packet has been received, could another packet be received.

To accommodate preemption, the final algorithm presented above is modified as follows. Whenever in the algorithm the action is to accept the packet, then SP(u) is checked. If SP(u)=0, then proceed as specified without modification. If SP(u)=1, then reject the packet and update all state variables in the same manner as they would have been if the buffer were found full. This modification is simply made by considering the buffer to be not full if and only if BF(k)=0 and SP(u)=0 except for p=u and tp=RTP(u).

The algorithm which accommodates broadcast and multicast traffic as well as preemption as described above follows.

When a packet destined to port O is received, the processor 54 at port O executes the following algorithm:

```
If RF(p)=0 [only V(p)=0 is possible], then
    if BF(p)=0 and p<=h, and SP(u)=0 then
        accept the packet;
        for k=p+1, ..., K-1,
            if RF(k)=1 and SP(k)=0, decrement c(k);
    else,
        reject the packet;
        record the packet (RF(p)=1, RTP(p)=tp);
        set V(p)=1;
        set W(p)=0;
        if p=0 or p=1, then
            set X(p)=1;
            for k=p+1, ..., K-1, update BF(k);
        if 1<p<h, then set h=m=p;
If RF(p)=1, then
    if tp<RTP(p) [only V(p)=0 is possible], then
        reject the packet;
        set W(p)=1;
        set Wt(p)=1;
    if tp>=RTP(p) [for tp=RTP(p), only V(p)=0 is possible],
    then
        if {SP(u)=0, BF(p)=0, V(p)=0, and p<=h}
        or {SP(u)=1, BF(k)=0, p=u, V(u)=0, and tp=RTP(u)}
        then
            accept the packet;
            erase the entry (RF(p)=0, SP(u)=0);
            for k=p+1, ..., K-1,
                if RF(k)=1 and SP(k)=0, decrement C(k);
            if ((p=0 or p=1) and W(p)=0), then
                set X(p)=0;
                for k=p+1, ..., K-1, update BF(k);
            if p=h then
                update m;
                if W(h)=0, set h=m;
        else,
            reject the packet;
            if V(p)=0, then
                record the packet (RF(p)=1, RTP(p)=tp);
                set V(p)=1;
                set W(p)=0;
            else, set W(p)=1
```

When the token is received, then

For k=0, 1, ..., K-1, do:

```
If RF(k)=0 and V(k)=0, then nothing;
If RF(k)=1 and V(k)=0, then
    erase the entry (RF(k)=0, SP(k)=0);
    if k=h, update m;
If RF(k)=1 and V(k)=1, then reset V(k)=0;
If RF(k)=0 and V(k)=1 (illegal state) then set V(k)=0.
For j=0, 1, if RF(j)=0 and Wt(j)=0, then
    set X(j)=W(j)=0;
    for k=j+1, ..., K-1, update BF(k);
For k=h, if RF(h)=0 and Wt(h)=0, then set h=m;
Reset Wt(k)=0.
```

G. Conclusion

A process for fairly allocating resources in a multi-port packet switch is disclosed. Each port is connected to a station and contains a transmit FIFO buffer for transmitting packets containing data originating at the associated station and a receive FIFO buffer which receives packets from other ports containing data destined for the associated station. The ports are connected by a broadcast transmission medium. A transmit buffer of a specific port gains access to the transmission medium when the port has a token which is passed from port to port in a round-robin fashion. When a port recognize that a transmitted packet is addressed to it, the port uses a local processor to determine whether or not to accept the packet. The determination is based on (1) information in the packet header (e.g., priority and address of the transmitting port; (2) the status of the receive buffer (full or not), and (3) other locally recorded information regarding past history of the acceptance or rejection of packets from particular ports and of particular priority classes, needed to achieve fairness among packets of the same class and priority among different classes. If the receiving port makes a determination to reject a packet, the receiving port issues a busy signal which is transmitted over the broadcast medium. When the transmitting port receives the busy signal, it aborts transmission of the packet and releases the token. If the receiving port decides to accept the packet, the packet is written into the receive buffer of the receiving port.

Finally, the above-described embodiments of the invention are intended to be illustrative only. Numerous alternative embodiments may be devised by those skilled in the art without departing from the spirit and scope of the following claims.

We claim:

1. In a network comprising a plurality of ports interconnected by a shared transmission medium, wherein each port comprises a transmit FIFO buffer containing packets to be transmitted via the transmission medium and a receive FIFO buffer for receiving packets transmitted via the transmission medium, a method for locally determining at each port whether a packet transmitted via the transmission medium and addressed to the port will be accepted into the receive buffer at the port or rejected comprising the steps of:

maintaining and storing current buffer status information at each port about the current capacity of the receive buffer at the port to receive packets via the transmission medium, determining and storing, under the control of a processor at each port, current packet status information characterizing one or more packets currently waiting at other ports for transmission to the port, said packet status information being determined locally at each port solely from packets which arrive at the port via the shared medium and which are accepted into the receive buffer or rejected, utilizing said processor at each port, locally determining at each port whether to accept or reject a packet currently arriving via the shared transmission medium in response to said buffer status information and said packet status information.

2. The method of claim 1 wherein each transmit buffer accesses the transmission medium to transmit a packet when it possesses a token which is passed among said ports in a round-robin fashion.

3. The method of claim 2 further comprising the step of:

in response to receiving said token at a port, utilizing said processor at said port to determine the validity of at least a portion of the packet status information stored at the port.

4. The method of claim 1 wherein said method further comprises, generating a busy signal when said currently arriving packet is rejected, transmitting the busy signal to the transmitting port of the currently arriving packet, and aborting transmission of the currently arriving packet.

5. The method of claim 1 comprising the step of utilizing said processor to update the current packet status information at a port when a packet is accepted into the receive buffer of the port.

6. The method of claim 1 wherein the packets transmitted in said network belong to a single priority class, wherein said packet status information determining step comprises determining and storing at each port the transmitting port address of at least one packet which was previously rejected at the port because said receive buffer at the port was full, wherein said accept/reject determining step comprises accepting a currently arriving packet at a port if the receive buffer is not currently full and no transmitting port address is stored at the port or the transmitting port address of the currently arriving packet is the same as a transmitting port address stored at the port, and otherwise rejecting the currently arriving packet.

7. The method of claim 1 wherein said packets transmitted in said network comprise packets of a plurality of priority classes.

8. The method of claim 7 wherein said packet status information determining step comprises the step of locally ascertaining at each port for each one of said priority classes information characterizing one or more packets waiting at other ports for transmission to the port, and generating locally at each port an indication of the highest priority class for which a packet is waiting for transmission to the port.

9. The method of claim 8 wherein said step of determining packet status information comprises ascertaining and storing at each port the transmitting port address of at least one packet of each priority class which was previously rejected at the port.

10. The method of claim 9 wherein said determining step further comprises, at each port, always rejecting a currently arriving packet whose priority is lower than said highest priority class for the port, at each port, accepting a currently arriving packet whose priority class is equal to said highest priority class for the port if the receive buffer of the port is not currently full and no transmitting port address is stored for this priority class or the transmitting port address of the currently arriving packet is the same as the transmitting port address stored for this priority class, and at each port, accepting a currently arriving packet if the currently arriving packet has a priority higher than said highest priority class for the port and if the receive buffer of the port is not currently full.

11. The method of claim 10 further comprising the step of after accepting a currently arriving packet, updating said indication of the highest priority class for which a packet is waiting for transmission to the port.

12. The method of claim 11 wherein said accept/reject determining step further comprises the step of whenever a packet of a certain priority class is blocked from being accepted at a port, limiting the number of higher priority packet which are accepted at the port to a predetermined number.

13. The method of claim 1 wherein said packets include packets which are transmitted from a transmitting port to a plurality of receiving ports.

14. The method of claim 13 wherein said packets destined to a plurality of ports have a higher priority classification than any packet destined to only a single port.

15. The method of claim 14 further including the step of reserving space in the receive buffer at each port for accepting packets destined to more than one receiving port.

16. In a port connected to a plurality of other ports via a shared transmission medium and connected to a processing station via a link and comprising a receive buffer for receiving packets of a plurality of priority classes from other ports and for transmitting data of the packets to the processing station, wherein the transmission capacity of the shared medium is greater than the transmission capacity of the link, a method for accepting into the receive buffer or rejecting packets transmitted over the shared medium comprising storing in a register means at the port buffer status information indicating whether or not the receive buffer is currently full, determining under the control of a processor located at said port packet status information about one or more packets waiting at one or more of said other ports for transmission to said port and storing said status information in said register means, said status information being determined solely from the history of acceptance and rejection of packets arriving at said port from particular other ports and belonging to particular priority classes, determining at said port under the control of said processor whether to accept or reject a packet currently arriving at said port utilizing said information stored in said register means and information contained in the packet header including priority class and transmitting port address.

17. The method of claim 16 further comprising the step of validating at least a portion of said packet station information when a token which is passed from port to port is present at the port.

18. The method of claim 16 further comprising the step of updating said buffer and packet status information when a packet is accepted into said receive buffer.

19. The method of claim 16 wherein some of said packets are packets transmitted to more than one port.

* * * * *